Patented Aug. 8, 1933

1,921,949

UNITED STATES PATENT OFFICE 1,921,949

TREATMENT OF CELLULOSE ESTERS

Samuel E. Sheppard, Rochester, N. Y., assignor to Eastman Kodak Company, Rochester, N. Y., a Corporation of New York No Drawing. Application April 22, 1930
Serial No. 446,412

4 Claims. (Cl. 260—102)

This invention relates to a process for treating cellulose ester compositions and particularly to the addition to such compositions of ingredients which enhance the quality of the products produced therefrom.

In the art of cellulose ester manufacture, notably cellulose acetate, it is difficult to avoid the use of copper or bronze equipment. The powerful chemicals of the esterifying solutions attack the equipment thereby forming soluble copper salts which are carried into the cellulose ester formed. The ester, of course, is subjected to several washing and leaching operations, subsequent to its formation, but the necessary economies required of commercial operations preclude the possibility of always completely removing the last traces of these occluded salts.

These contaminating substances often, therefore, afford free cupric or cuprous ions—the latter passing by oxidization into cupric ions—which are detrimental to many products into which the cellulose ester may be fabricated. Cupric ions have a strong desensitizing effect on photographic emulsions, where the material is used as a support for photographic film, and can give rise to either general or local desensitizing action on the sensitive coating. These ions are likewise powerful catalysts for autoxidization, thus encouraging reduction in strength of the material, a matter of importance in the artificial silk industry. Furthermore, cupric ions in the cellulose ester interfere with dyeing processes.

An object of the present invention is to provide a process for so treating cellulose esters that the above disadvantages are inhibited. Another object of this invention is the addition of certain compounds to the cellulose esters to effect such a result. A further object is the addition of substances to the cellulose ester which will combine with the cupric ions found therein, rendering their presence not objectionable. Other objects will hereinafter appear.

I have found that certain organic or inorganic substances may be advantageously added to cellulose ester compositions whereby the deleterious activity of metallic ions contained therein and particularly copper ions can be inhibited. I have found that certain substances which combine with the cupric ions and hold the copper in non-reactive complexes, when added to or present in cellulose ester compositions, result in a marked improvement in the quality of the products fabricated therefrom.

The substances which will produce such non-reactive complexes with the metallic ions, and particularly the cupric ions, include the following compounds and their equivalents. Organic or inorganic alkaline cyanides; the oxalic, tartaric, pyruvic acids and generally oxy-carboxylic acids or their derivatives, as salts and esters of them; as well as the oximes and notably the aldoximes. These compounds may be used in amounts generally not more than 5% of the weight of the cellulose ester, which is usually sufficient to destroy the desensitizing or other undesirable activity of the copper ions.

The alkaline cyanides, oxy-carboxylic acids and and oximes form non-reactive complexes of the following types:

Cyanides and derivatives

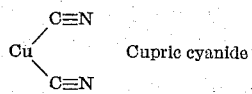

Cupric cyanide

Oxy-carboxylic acids and derivatives

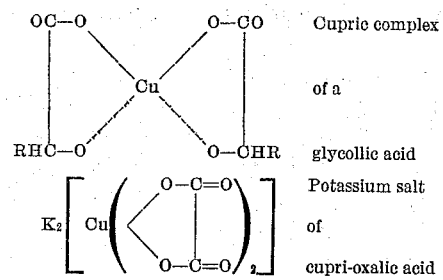

Cupric complex of a glycollic acid

Potassium salt of cupri-oxalic acid

Potassium salt of cupri-salicylic acid

Amino-acids and derivatives

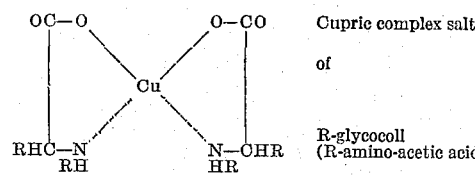

Cupric complex salt of R-glycocoll (R-amino-acetic acid)

Oximes and derivatives

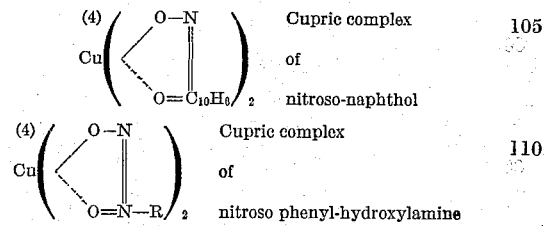

Cupric complex of nitroso-naphthol

Cupric complex of nitroso phenyl-hydroxylamine

In the above formulæ R represents an acyl or an alkyl group.

The mode of use of these inhibitors will differ in accord with their solubility. The water soluble compounds such as the cyanides and the oxy-carboxylic acids can be added to cellulose acetate solutions in acetone subsequent to washing free from the acetic acid acetylation bath. This impregation should preferably be followed by another brief wash. If the compound be not sufficiently water soluble, it may be dissolved in any suitable solvent, providing the solvent has no deleterious effect upon cellulose ester or the products prepared from it. Various methods of incorporating the compounds uniformly throughout the cellulose ester being treated will suggest themselves to skilled chemists, for example, using a common solvent of the compound and the cellulose ester, thus effecting complete solution of both and subsequently coagulating the cellulose ester in a non-solvent or by evaporation of the solvent, or again by spraying the solvated compound into a precipitated cellulose ester.

While the above named compounds and their immediate equivalents may be used per se, I have likewise found that a more powerful retardation of the activity of the cupric or similarly acting ions can be obtained by the direct addition to the dope or to a solution of the cellulose ester, e. g. cellulose acetate, of small quantities of one of the esters, e. g. ethyl ester of the oxy-carboxylic acids, or small quantities of the aldoximes, e. g. benzildioxime, or benzoinoxime, or benzophenoneoxime, in quantity up to about 5% of the dry cellulose ester.

From a consideration of the above disclosure it will be apparent that the addition of any compound which will inhibit the activity of the cupric or like ions by the formation of non-reactive complexes therewith when present in a cellulose ester composition and particularly the use of esters of such compounds for the same purpose as well as the products such as photographic film, artificial cellulose ester silk and textiles obtained therefrom will come within the scope of this invention.

What I claim as my invention and desire to secure by Letters Patent of the United States is:

1. A process for rendering cellulose esters free from the deleterious effects of the metallic impurities contained therein which comprises adding an alkaline cyanide thereto, said addition being made subsequent to the formation of the cellulose esters.

2. A process for rendering cellulose esters free from the deleterious effects of occluded copper which comprises adding an ester of an alkaline cyanide thereto subsequent to the formation of the cellulose esters.

3. A process for rendering cellulose acetate free from the deleterious effects of occluded copper which comprises adding thereto an alkaline cyanide subsequent to the formation of the ester, but prior to the final washing.

4. A new composition of matter comprising cellulose acetate containing from 1 to 5 per cent of an alkaline cyanide.

SAMUEL E. SHEPPARD.